United States Patent
Shemesh

(10) Patent No.: US 10,296,653 B2
(45) Date of Patent: May 21, 2019

(54) SYSTEMS AND METHODS FOR ACCELERATING WEB PAGE LOADING

(75) Inventor: Yaniv Shemesh, Kadima (IL)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/225,593

(22) Filed: Sep. 6, 2011

(65) Prior Publication Data

US 2012/0066586 A1    Mar. 15, 2012

Related U.S. Application Data

(60) Provisional application No. 61/380,330, filed on Sep. 7, 2010.

(51) Int. Cl.
    *G06F 17/00*    (2006.01)
    *G06F 17/30*    (2006.01)

(52) U.S. Cl.
    CPC .............. *G06F 17/30902* (2013.01)

(58) Field of Classification Search
    CPC ................................... G06F 9/4443
    USPC .................... 715/234, 235, 200
    See application file for complete search history.

(56) References Cited

U.S. PATENT DOCUMENTS

| | | |
|---|---|---|
| 6,311,278 B1 | 10/2001 | Raanan et al. |
| 6,330,574 B1 | 12/2001 | Murashita |
| 6,363,056 B1 | 3/2002 | Beigi et al. |
| 6,505,242 B2 * | 1/2003 | Holland .............. G06F 17/3089 707/E17.116 |
| 6,883,137 B1 | 4/2005 | Girardot et al. |
| 6,886,132 B1 * | 4/2005 | Hall et al. ................ 715/234 |
| 6,970,924 B1 | 11/2005 | Chu et al. |
| 6,973,490 B1 | 12/2005 | Robertson et al. |
| 6,990,074 B2 | 1/2006 | Wan et al. |
| 7,003,564 B2 | 2/2006 | Greuel et al. |
| 7,065,482 B2 | 6/2006 | Shorey et al. |
| 7,080,314 B1 | 7/2006 | Garofalakis et al. |
| 7,089,491 B2 | 8/2006 | Feinberg et al. |
| 7,191,163 B2 | 3/2007 | Herrera et al. |
| 7,197,639 B1 | 3/2007 | Juels et al. |
| 7,292,541 B1 | 11/2007 | CS |
| 7,296,061 B2 | 11/2007 | Martinez et al. |
| 7,296,263 B1 | 11/2007 | Jacob |
| 7,409,440 B1 | 8/2008 | Jacob |
| 7,468,979 B2 | 12/2008 | Ricciulli |
| 7,577,758 B2 | 8/2009 | Ricciulli |
| 7,584,393 B2 | 9/2009 | Kamada et al. |
| 7,710,867 B1 | 5/2010 | Masters |
| 7,774,492 B2 | 8/2010 | Raphel et al. |
| 7,860,815 B1 | 12/2010 | Tangirala |
| 8,001,246 B2 | 8/2011 | Lu et al. |
| 8,112,308 B1 * | 2/2012 | Ho et al. ................ 705/14.49 |

(Continued)

OTHER PUBLICATIONS

F5 Networks, Inc., "Application Firewalls", White Paper, Copyrighted Oct. 2007, 7 pgs.

(Continued)

*Primary Examiner* — Manglesh M Patel
(74) *Attorney, Agent, or Firm* — Pepper Hamilton LLP

(57) ABSTRACT

A system for accelerating web page loading in a user client is provided. The system includes computing platform being in communication with the user client and being configured for changing object delivery/loading order or object rendering at the web browser, or bundling the objects into one or more bundles according to object use and change frequency.

27 Claims, 3 Drawing Sheets

(56) References Cited

U.S. PATENT DOCUMENTS

| | | | |
|---|---|---|---|
| 8,261,351 B1 | 9/2012 | Thornewell et al. | |
| 8,407,576 B1* | 3/2013 | Yin et al. | 715/206 |
| 9,578,055 B1 | 2/2017 | Khanal | |
| 2002/0087571 A1 | 7/2002 | Stapel et al. | |
| 2002/0087744 A1 | 7/2002 | Kitchin | |
| 2002/0099829 A1 | 7/2002 | Richards et al. | |
| 2002/0174216 A1 | 11/2002 | Shorey et al. | |
| 2003/0018450 A1 | 1/2003 | Carley | |
| 2003/0033369 A1 | 2/2003 | Bernhard | |
| 2003/0131052 A1 | 7/2003 | Allan | |
| 2003/0191803 A1 | 10/2003 | Chinnici et al. | |
| 2003/0200289 A1 | 10/2003 | Kemp et al. | |
| 2003/0212954 A1 | 11/2003 | Patrudu | |
| 2003/0236995 A1 | 12/2003 | Fretwell, Jr. | |
| 2004/0006741 A1 | 1/2004 | Radja et al. | |
| 2004/0015783 A1 | 1/2004 | Lennon et al. | |
| 2004/0123277 A1 | 6/2004 | Schrader et al. | |
| 2004/0133605 A1 | 7/2004 | Chang et al. | |
| 2004/0138858 A1 | 7/2004 | Carley | |
| 2004/0143670 A1 | 7/2004 | Roychowdhury et al. | |
| 2004/0215665 A1 | 10/2004 | Edgar et al. | |
| 2004/0225656 A1 | 11/2004 | Sarkar | |
| 2005/0028080 A1* | 2/2005 | Challenger | G06F 17/2247 715/205 |
| 2005/0160153 A1 | 7/2005 | Knutson et al. | |
| 2005/0246717 A1 | 11/2005 | Poole et al. | |
| 2006/0015846 A1* | 1/2006 | Fraleigh et al. | 717/109 |
| 2006/0235976 A1 | 10/2006 | Chen et al. | |
| 2006/0277606 A1 | 12/2006 | Yunus et al. | |
| 2006/0282442 A1 | 12/2006 | Lennon et al. | |
| 2006/0291388 A1 | 12/2006 | Amdahl | |
| 2007/0011605 A1 | 1/2007 | Dumitru et al. | |
| 2007/0064610 A1 | 3/2007 | Khandani et al. | |
| 2007/0067839 A1 | 3/2007 | Hamada et al. | |
| 2007/0067841 A1 | 3/2007 | Yegneswaran et al. | |
| 2007/0150574 A1 | 6/2007 | Mallal et al. | |
| 2008/0065653 A1 | 3/2008 | Shneur et al. | |
| 2008/0168150 A1 | 7/2008 | Chen et al. | |
| 2008/0212499 A1 | 9/2008 | Maes | |
| 2008/0228911 A1 | 9/2008 | Mackey | |
| 2008/0271046 A1 | 10/2008 | Lipton et al. | |
| 2009/0037998 A1 | 2/2009 | Adhya et al. | |
| 2009/0094377 A1* | 4/2009 | Zahavi et al. | 709/232 |
| 2009/0217386 A1 | 8/2009 | Schneider | |
| 2010/0031315 A1 | 5/2010 | Feng et al. | |
| 2010/0138809 A1 | 6/2010 | Shenfield et al. | |
| 2010/0242092 A1 | 9/2010 | Harris et al. | |
| 2010/0306827 A1 | 12/2010 | Balducci et al. | |
| 2014/0321462 A1 | 10/2014 | Kancherla | |
| 2014/0365680 A1 | 12/2014 | Van Bemmel | |

OTHER PUBLICATIONS

"Ethereal—Interactively browse network traffic," www.ethereal.com/docs/man-pages/ethereal.1.html, (accessed Apr. 15, 2004).

"Tethereal—Dump and analyze network traffic," www.ethereal.com/docs/man-pages/tethereal.1.html, (accessed Apr. 15, 2004).

"Editcap—Edit and/or translate the format of capture files," www.ethereal.com/docs/man-pages/editcap.1.html, (accessed Apr. 15, 2004).

"Network Sniffer," www.linuxmigration.com/quickref/admin/ethereal.html, (accessed Apr. 15, 2004).

"FAQ: Network INtrusion Detection Systems," Version 0.8.3, Mar. 21, 2000, www.robertgraham.com/pubs/network-intrusion-detection.html.

Secure64 Software Corporation, "Surviving DNS DDoS Attacks: Introducing self-protecting servers," White Paper, Mar. 19, 2007 (18 pages).

"The-binary Advisory," The Honeynet Project, 4 pages, http//www.honeynet.org/reverse/results/sol/sol-17/advisory.html (accessed Feb. 20, 2008).

"Denial-of-service attack," Wikipedia, the free encyclopedia, 10 pages., http://en.wikipedia.org/w/index.php?title=Denial-of-service_attack&printables=yes (accessed Nov. 5, 2007).

"Canonical Name Record (CNAME)," CNAME Record: Chapter 8, ZyTrax, Inc., 3 page, http://www.zytrax.com/books/dns/ch8/cname.html (accessed Feb. 20, 2008).

F5 Networks Inc., "Optimize WAN and LAN Application Performance with TCP Express", F5 Networks Inc., White Paper, Aug. 2007, pp. 1-7, <www.f5.com>.

F5 Networks Inc., "Take Control of Multiple ISP Connections", F5 Networks Inc., BIG-IP Link Controller, Datasheet, Nov. 26, 2013, pp. 1-4, <www.f5.com>.

F5 Networks Inc., "Application Delivery with Programmable Infrastructure", F5 Networks Inc., BIG-IP Local Traffic Manager, Datasheet, Jul. 29, 2014, pp. 1-8, <www.f5.com>.

F5 Networks, "BIG-IP® Local Traffic Manager™: Implementations", Manual, May 24, 2016, pp. 1-232, 12.1, F5 Networks, Inc.

Box et al.; Simple Object Access Protocol (SOAP); 1.1; May 8, 2000; pp. 1-34.

Levy, Ken; New XML Tools in Visual Studio 2005; Jul. 21, 2004; MSDN Blogs; p. 1.

Robot Wars—How Botnets Work, http://www.windowsecurity.com/articles/Robot-Wars-How-Botnets-Work.html, launched Oct. 20, 2005 (accessed Dec. 15, 2006), 10 pgs.

* cited by examiner

SYSTEMS AND METHODS FOR ACCELERATING WEB PAGE LOADING

RELATED APPLICATIONS

This patent application claims the priority of U.S. provisional patent Ser. No. 61/380,330 filing date Sep. 7, 2010, which is incorporated herein in its entirety.

FIELD AND BACKGROUND OF THE INVENTION

The present invention relates to systems and methods for accelerating web page loading. Specifically, the present invention relates to a system which accelerates web page loading without requiring modifications to user client software or to the manner in which users operate such software.

It is widely accepted that fast-loading web pages improve the user experience and thus enhance data retrieval, e-commerce and the like. A recent study has shown that even though Internet outages receive the bulk of the press, slow web page loading represented the majority of e-commerce impact costing on-line retailers three times as much as unplanned outages. According to two surveys conducted by Forrester Research and Gartner Group, e-commerce sites are losing $1.1 to $1.3 billion in revenue each year due to customer click-away caused by slow web page loading. Thus, it does not matter how beautiful and informative a web page is, it will not generate the business needed to survive if it takes too long to load.

The load time of a web page can be affected by a number of factors including the size and complexity of the web page, the responsiveness and location of the site's servers, and the Internet connection speed of the end users. Although end-user bandwidth has increased in the last several years, web page designs have evolved to include more scripts, stylesheets, images, and Flash™ and since in some cases the majority of a page load time is spent in separate HTTP requests for such objects, page load times are still less than optimal for many sites.

In recent years, several approaches for accelerating web page loading have been implemented on the server or client side.

Asynchronous JavaScript and XML (AJAX) enables a browser to alter the layout of the page instantly or fetch a small amount of HTML, XML, or JavaScript from the server and alter the existing page rather than completely retrieve a new page with every click. This significantly decreases the amount of time between a user click and the browser finishing rendering the new content. Although use of AJAX results in some acceleration of web page loading, with AJAX users have less intuition about which type of events within a page may result in a need to wait for a server response. In addition, AJAX can perform poorly over slow or unreliable networks and thus may reduce usability if not carefully designed to accommodate both fast and slow network characteristics.

Content Delivery Networks (CDNs) accelerate content fetching by caching it closer to the end-user in terms of round trip time (RTT), however, CDNs are relatively costly in terms of performance, are static and thus cannot handle dynamic content and do not handle browser delays resulting from, for example, from JavaScript.

WAN Optimization Controllers (WOCs) are devices which are used to accelerate content delivery between two points. However, since WOCs are symmetrical in nature, they require installation at many points.

Application Front Ends (AFEs), Load Balancers (LBs), and database (DB) accelerators are all technologies used for accelerating the backend (server). However, in current networks the backend only contributes about 15% to the overall non-responsiveness in web page loading.

Although the above described approaches can be used to accelerate web page loading, there remains a need for systems which can be used to substantially accelerate web page loading, and especially systems which do not require modification to the frontend (user client) for operability.

SUMMARY OF THE INVENTION

The present invention successfully addresses the shortcomings of the presently known configurations by providing a system capable of substantially accelerating web page loading without requiring modifications to the user client.

According to an embodiment of the invention a system is provided and may be arranged to accelerate web page loading in a user client, the system may include a computing platform being in communication with the user client and being configured for: (a) bundling a plurality of objects of the web page into a first bundle; (b) bundling a portion of said plurality of objects into a second bundle; and (c) providing said first or said second bundle to the user client upon request for the web page.

The computing platform may be a web server being in communication with the user client over a communication network.

The web server may be a web proxy.

The user client may be a web browser.

The communication network may be a computer network, a cellular network or a combination thereof.

The system may be arranged to determine which of the first and second bundle to provide according to a cache of the user client.

The bundling may be effected using JAR or (binary) MHTML format.

The computing platform may modify a source code of said web page to enable said user client to utilize said first or said second bundle in rendering the web page.

The system may be arranged to determine (a) and (b) are effected following said request for the web page.

According to an embodiment of the invention a system is provided and may be arranged to accelerate web page loading in a user client, the system may include a computing platform being in communication with the user client and being configured for bundling a plurality of objects of the web page into a bundle having a size equal to or smaller than a browser receive window.

According to an embodiment of the invention a system is provided and may be arranged to accelerate web page loading in a user client, the system may include a computing platform being in communication with the user client and being configured for bundling a plurality of objects of the web page into at least one bundle, wherein co-bundling of objects is effected according to an expected frequency of change of said objects.

According to an embodiment of the invention a system is provided and may be arranged to accelerate web page loading in a user client, the system may include a computing platform being in communication with the user client and being configured for bundling a plurality of objects of the web page into at least one bundle, wherein said at least one bundle is optimized for a cache of the user client using an e-tag and/or cookie derived information.

According to an embodiment of the invention a system is provided and may be arranged to accelerate web page loading in a user client, the system may include a computing platform being in communication with the user client and being configured for controlling the rate and/or order of objects of the web page loaded by the user client upon request for the web page.

The computing platform may modify a source code of the web page to include object loading instructions executable by the user client.

The instructions may be included in a java script.

The object loading instructions may be optimized according to network to delivery time, progressiveness, minimization of browser stalling, object visibility in rendered Web page, downstream bandwidth of client, type of client browser, type of content, size of content or progressiveness of content.

According to an embodiment of the invention a system is provided and may be arranged to accelerate web page loading in a user client, the system may include a computing platform being in communication with the user client and being configured for providing the user client with a dynamic object placeholder in response to a request for a web page including a dynamic portion of the content, said dynamic object placeholder including non-dynamic content and being configured for requesting said dynamic portion of the content from a server of the web page.

According to an embodiment of the invention a system is provided and may be arranged to accelerate web page loading in a user client, the system may include a computing platform being in communication with the user client and being configured for replacing a first character set of an object of a web page with a second character set to thereby reduce the object size.

According to an embodiment of the invention a system for enhancing web experience of a user may be provided and may include a computing platform being in communication with a user client and being configured for (a) providing said user client with an image representing a web page requested by the user client; and (b) replacing said image with interactive content of said web page.

According to an embodiment of the invention a system for accelerating web page loading in a user client is provided and may include a computing platform being in communication with the user client and being configured for bundling a plurality of objects of the web page into a bundle.

The bundle may be a first bundle and wherein the computing platform is further configured for bundling a portion of said plurality of objects into a second bundle; and for providing said first or said second bundle to the user client upon request for the web page.

The computing platform may be configured for bundling the plurality of objects into the bundle, wherein the bundle has a size equal to or smaller than a browser receive window.

The computing platform may be configured for co-bundling in response to an expected frequency of change of said objects.

The computing platform may be configured for bundling the plurality of objects of the web page into at least one bundle, wherein said at least one bundle is optimized for a cache of the user client using an e-tag and/or cookie derived information.

According to an embodiment of the invention a system may be provided for accelerating web page loading in a user client, the system may include a computing platform being in communication with the user client and being configured for controlling at least one out of rate and an order of objects of the web page loaded by the user client upon request for the web page.

The computing platform may modify a source code of the web page to include object loading instructions executable by the user client.

The object loading instructions may be optimized according to at least one parameter out of a network delivery time, a progressiveness, a minimization of browser stalling, an object visibility in rendered Web page, a downstream bandwidth of client, a type of client browser, a type of content, a size of content and a progressiveness of content.

According to an embodiment of the invention a non-tangible computer readable medium may be provided and it may store instructions for controlling at least one out of rate and an order of objects of the web page loaded by the user client upon request for the web page.

According to an embodiment of the invention a method for accelerating a loading of a web page is provided, the method may include controlling at least one out of rate and an order of objects of the web page loaded by the user client upon request for the web page.

The method may include the stages of, the system may be arranged to and, additionally or alternatively, the non-tangible computer readable medium may store instructions for modifying a source code of the web page to include object loading instructions executable by the user client.

The method may include the stages of, the system may be arranged to and, additionally or alternatively, the non-tangible computer readable medium may store instructions for loading the objects of the web page such as to optimize to at least one parameter out of: a network delivery time, a progressiveness, a minimization of browser stalling, an object visibility in rendered Web page, a downstream bandwidth of client, a type of client browser, a type of content, a size of content and a progressiveness of content.

The method may include the stages of, the system may be arranged to and, additionally or alternatively, the non-tangible computer readable medium may store instructions for controlling an order of objects of the web page based on priorities of the objects of the web page.

The method may include the stages of, the system may be arranged to and, additionally or alternatively, the non-tangible computer readable medium may store instructions for prioritizing a loading of objects of a web page that are included in an estimated window that is displayed to a user.

The method may include the stages of, the system may be arranged to and, additionally or alternatively, the non-tangible computer readable medium may store instructions for reducing a priority of advertisement related objects of the web page.

The method may include the stages of, the system may be arranged to and, additionally or alternatively, the non-tangible computer readable medium may store instructions for detecting a third party object that points to a third party URL; re-directing the third party object to a computing platform that executes the instructions stored in the non-tangible computer readable medium.

The method may include the stages of, the system may be arranged to and, additionally or alternatively, the non-tangible computer readable medium may store instructions for determining a point in time in which the third party object should be re-directed to the third party URL; and directing, at the point of time, the third party object the third party URL.

The method may include the stages of, the system may be arranged to and, additionally or alternatively, the non-tangible computer readable medium may store instructions for reducing a priority of the third party objects.

The method may include the stages of, the system may be arranged to and, additionally or alternatively, the non-tangible computer readable medium may store instructions for reducing a priority of a third party object that is located outside the visibility window.

The method may include the stages of, the system may be arranged to and, additionally or alternatively, the non-tangible computer readable medium may store instructions for receiving from a client device and over multiple connections, multiple requests to obtain multiple objects of the web page; sending to the client a first object over a first connection of the multiple connections; and sending to the client a second object over a second connection before receiving an first object reception acknowledgement from the client.

The multiple connections are TCP connections, the method may include, and the non-tangible computer readable medium may store instructions for sending of the second object before receiving a first object TCP reception acknowledgement.

The method may include the stages of, the system may be arranged to and, additionally or alternatively, the non-tangible computer readable medium may store instructions for starting the sending of the first object by sending a large amount of TCP packets, each TCP packet comprises a portion of the first object. The large amount of TCP packets has an aggregate payload of a size that exceeds 10 kilobytes.

The method may include the stages of, the system may be arranged to and, additionally or alternatively, the non-tangible computer readable medium may store instructions for determining an order of sending of objects to the clients based upon priorities of the objects.

The method may include the stages of, the system may be arranged to and, additionally or alternatively, the non-tangible computer readable medium may store instructions for sending a single object to the client at a time.

The method may include the stages of, the system may be arranged to and, additionally or alternatively, the non-tangible computer readable medium may store instructions for determining a timing of sending of the second object based upon an estimated latency of the client.

The method may include the stages of, the system may be arranged to and, additionally or alternatively, the non-tangible computer readable medium may store instructions for estimating an estimated available bandwidth for a transmission of the second object based upon bandwidth that was available for a transmission of the first object; and determining a timing of sending of the second object based upon the estimated available bandwidth for a transmission of the second object.

The method may include the stages of, the system may be arranged to and, to additionally or alternatively, the non-tangible computer readable medium may store instructions for prioritizing a transmission of Cascading Style Sheets (CSS) related to the web page over a transmission of a JavaScript related to the web page.

The method may include the stages of, the system may be arranged to and, additionally or alternatively, the non-tangible computer readable medium may store instructions for prioritizing a transmission of Cascading Style Sheets related to a visibility window over a transmission of CSS related to non-displayed content of the web page.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
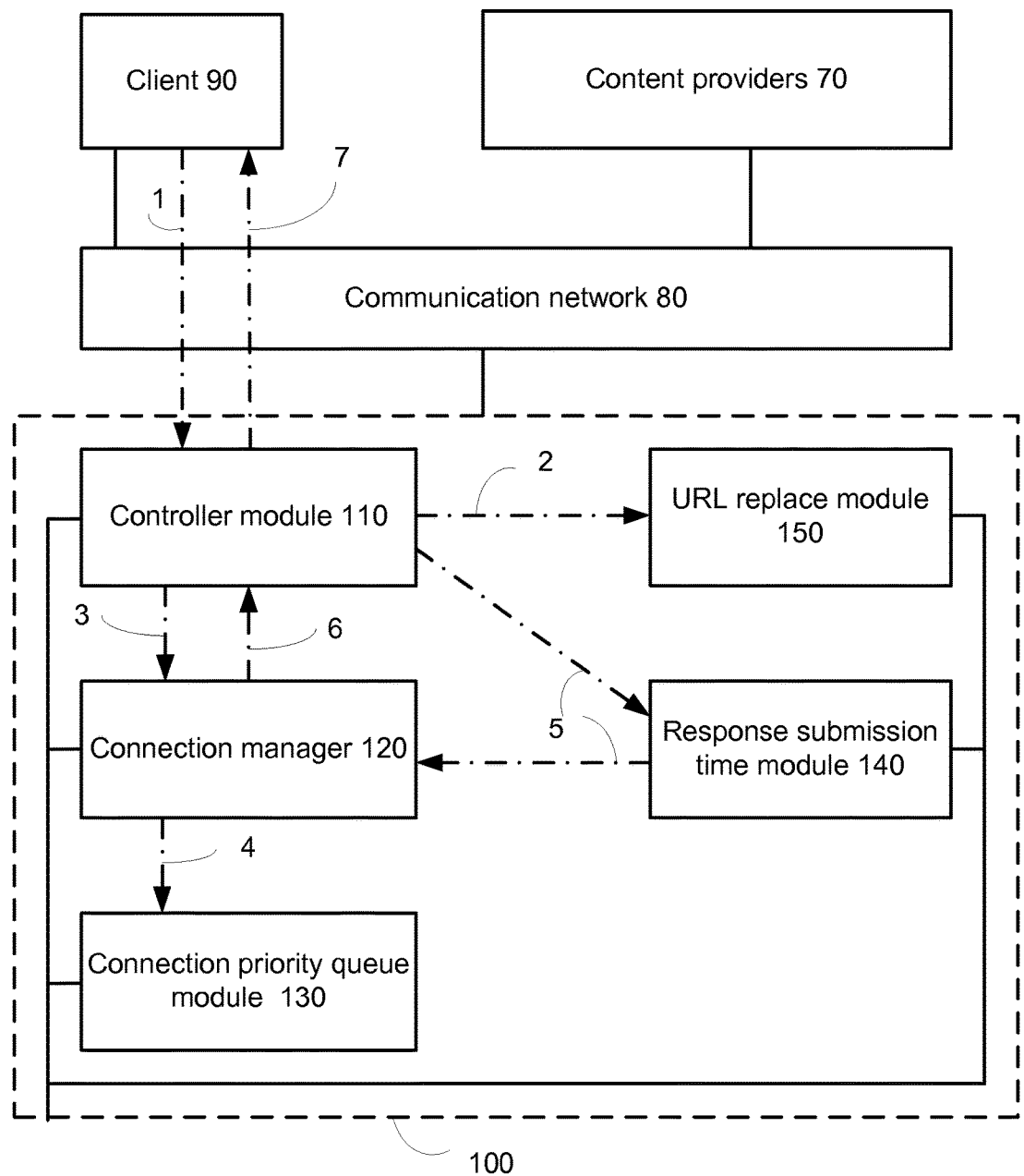
FIG. 1 is a flowchart diagram illustrating interaction between the various modules of the Connection Manager aspect of the present invention.

The present invention is of a system and method which can be used to substantially enhance browsing performance and thus user browsing experience.

The principles and operation of the present invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

The World Wide Web is used for commerce, entertainment, data mining and as a platform for advertising and thus provides a platform for commercial opportunities. Worldwide spending on internet advertising will total $65.2 billion in 2008, or nearly 10% of all ad spend across all media, and grow 15-20% a year to reach $106.6 billion in 2011, or 13.6% of total ad spend (IDC's Digital Marketplace Model and Forecast).

Frustration over congestion issues in the Internet infrastructure and the high latency that results in slow browsing has led to a pejorative name for the World Wide Web: the World Wide Wait and thus brings into question future growth of on-line commerce and advertising.

Standard guidelines for Web response times are 0.1 second for an ideal response time (the user doesn't sense any interruption); 1 second for an acceptable response time (download times above 1 second interrupt the user experience); and 10 seconds for an unacceptable response time (the user experience is interrupted and the user is likely to leave the site or system).

In order to ensure growth of on-line advertising and commerce, the user's browsing experience must be accelerated to meet the ideal Web response time.

While reducing the present invention to practice, the present inventor has devised several unique approaches for enhancing on-line browsing and decreasing web page load times without requiring web browser modifications.

Thus, according to one aspect of the present invention there is provided a method of accelerating web page loading in a user client.

As used herein, the phrase "user client" refers to a user operable device which is capable of displaying web content. Examples of user clients include handheld devices such as smart phones, PDAs, and tablets, portable devices such as netbook and laptop computers and stationary devices such as desktop computers. A "user agent" is a software application such as a web browser (e.g. Internet Explorer, Firefox, Chrome or Safari) which is capable of loading and displaying Web content such as Web pages.

The present method can be effected by a system which includes a computing platform capable of communicating with user clients through a communication network and further capable of executing a software application designed and configured for providing the optimizations described herein.

The computing platform of the present invention can store and serve Web content (e.g. Web sites) in which case it forms a part of a Web server, or it can be in communication with Web servers which provide such data to the user client in which case it serves as intermediary (e.g. proxy server) between the Web server and the user client.

In cases where the computing platform of the present invention forms a part of a Web server such a web server stores Web site content which is optimized according to the teachings of the present invention.

In cases where the computing platform of the present invention serves as an intermediary between a Web server and a user client, the optimizations described herein can be performed upon request for specific content or in the background in which case the computing platform caches an updated copy of Web sites (e.g. popular Web sites) and serves the cached copy to the user client upon request.

The present system can utilize one or more approaches for accelerating web page serving and rendering. These approaches, which are outlined below and described in detail in the Examples section which follows can be used individually or in combinations to accelerate Web page load times and thus reduce the Web response times to within the ideal or acceptable response times.

One approach for accelerating Web page load times is bundling of Web page objects. Bundling assembles objects of a Web page into a single object and thus reduces the number of requests needed to load the page.

If N_with the number of objects fetched from a given domain when bundling is used, N_without is the number objects fetched from the domain without bundles being used, N_connections is the number of connections used to fetch the objects, and RTT is the round trip time to this domain, a good approximation of the time saved when using bundles is:

(N_without−N_with)*RTT/N_connections.

Such bundling can be effected using either JAR archiving, MHTML archiving, image gluing or inline data URI.

Although bundling can be used to substantially enhance page load times by decreasing RTT, it suffers from several limitations. Web content that changes over time renders bundles partially not updated and therefore decreases efficiency of the bundling mechanism. In addition, some content (objects) can be used by multiple pages of a Web site and loaded several times when navigating between Web pages of Web site. Without bundling such objects are loaded once and then retrieved from cache when needed. Bundling of such objects forces the browser to reload the entire bundle which can slow down rendering.

This problem can be illustrated with a bundle B of objects a, b, c and d. Each time a Web page is loaded (without cache), the browser downloads B which consists of the 4 objects. Now assume a case where objects a and b are not needed by the Web page, but c and d are. If bundle B is used to render future versions of this Web page downloaded data will include redundant objects a and b. If one generates a new bundle C that consists of c and d only, browsers that have bundle B cached and need objects c and d will have to load bundle B from cache when they are downloading to bundle C.

Another problem with bundling arises when the same object is used in different Web pages of a Web site. Assume two pages, P and Q, both using objects a and b. If a browser was used to navigate to Web page P and thereafter to Web page Q, when Q is visited, objects a and b are already cached and so the browser does not need to reload these objects. If objects a, b, c and d are bundled for page P and objects a, b, e and f are bundled for page Q, when Q is visited, objects a and b need to be loaded instead of being retrieved from cache. This problem becomes more complex with an increase in the number of Web pages that share identical objects.

The present system utilizes a bundling scheme that takes into consideration the above described limitations and thus provides the acceleration benefits associated with object bundling and yet traverses the limitations described above. Example 1 of the Examples section which follows describes in detail such bundling schemes and provides additional optimizations related to optimal bundle size, and bundle transfer methods.

Another approach for accelerating Web page load times used by the present invention optimizes loading of a Web site and the number and order of connections established between the user client and server.

Optimizing loading order of objects/bundles can be used to substantially enhance Web page load times. In order to force the browser to load a Web page's resources in a specific order, the present invention inserts a JavaScript code in the beginning of the HTML of a Web page. This JavaScript is the first code executed by the browser when the Web page is fetched. The code is designed to perform two tasks: it sets object/bundle loading order according to a predetermined optimum and it informs the server of completion of loading of an object.

Execution of this JavaScript code by the browser results in a request for an object while preserving some loading order for each connection between the browser and server (typically 6 on newer browsers and 2 on older browsers).

On the server side, requests come in for page objects. In order to avoid congestion of a browser's downlink and enhance progressiveness, the present system delays transmission of some of the objects in a way that allows only a given number (typically 1, maybe 2) of requests to be sent simultaneously. In order to do that, the to present system calculates, estimates or is notified when each object is received by the browser, so that it can trigger the transmission of the next object.

Using such a transmission approach ensures that objects appear in the right order and therefore the end-user browser experience in enhanced. Such controlled transmission enhances loading progressiveness, as objects do not compete for bandwidth, and are downloaded sequentially, while otherwise they were downloaded in parallel, competing for the same downlink, resulting in a much longer download time for each object. Furthermore, this controlled transmission also accelerates the overall download time as it decreases retransmission since fewer connections compete for the same downlink.

An important factor with object serving is finding the right order of objects, i.e. the object serving order which produces the best end-user experience. The present system utilizes a browser to render each page twice: once with an object and once without. By examining the changes between the two pages, one can tell which area of the page is influenced by the object.

The above described Web page serving approaches which form a part of the "connection manager" feature of the present system are described in detail in Example 2 of the Examples section which follows.

The present system also enables automatic selection of a Web page optimization level. By building several versions of a Web site each with different optimization schemes and testing these versions against several browsers, the present system can determine and automatically serve an optimized version of a Web site according to the browser used by the user client. Since some of the optimizations described herein may cause a Web page to render differently the system of the present invention internally caches versions of a Web page with several levels of optimizations and uses browsers to inspect the effect of such optimizations on Web page load times and rendering. Based on cumulative results, the present system can then select optimizations suitable for different pages and different browsers. Example 3 of the Examples section which follows described in detail various optimization schemes that can be provided by the present system.

The present system can also utilize an AJAX based delta content fetcher. The present system can be 'taught' to distinguish between the common part of a dynamic response and the changing part. When a request for a dynamic object is received the present system immediately return the skeleton of the Web page and an AJAX that asks for the dynamic portion. In parallel it requests the dynamic object(s) from the Web server. When the AJAX request is received by the present system it immediately returns the cached dynamic object(s). This accelerates the progressiveness of loading the page. Example 4 of the Examples section which follows describes the AJAX-based delta content fetched of the present system.

The present system can also be configured to provide a user with a snapshot of a web page before its completely loaded. Since it takes less time to load an image of a Web page than to load and render objects of the page, the present system can store, for each Web page, an image depicting the Web page. Upon request for a Web page, the present system first serves the image and then progressively replaces portion of the image with actual Web page content. This enables a user to see what the Web page includes and provides a feeling of faster loading. Since the image is passive and cannot be interacted with, the system provides an indication to the end-user (progress bar for each element) when a portion or element of a Web page is loaded and active. This feature of the present system is further described in Example 5 of the Examples section which follows.

The present system can also be used to change the character set of a Web page. HTML uses various character sets to represent text. Some character sets weigh (in Kb) more than others. The present system checks the character set of each object, if it finds an alternative character set that can represent the content while weighing less, it switches the character set of the object. This reduces the number of bytes transferred and accelerates rendering time, load time and progressiveness. This feature of the present system is further described in Example 6 of the Examples section which follows.

Thus, the present invention provides a system and method for accelerating Web page load times and enhancing a users browsing experience. The present invention can be utilized to enhance and accelerate Web page loading of any Web site and any content. The present system is especially useful in cases where the Web response times are below optimum and thus negatively impact the user experience, site visits and site browsing session times.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

Example 1—Use of Bundles for Enhancing End-User Experience

With HTTP, a user client (operating a Web browser) sends a request to the web server for each object used to build the Web page. The server typically answers with a response containing the object that was requested by the client. The time it takes for such a transaction to complete is the round trip time+transfer time.

The following example illustrates user client access to an HTML Web page that includes 6 objects. For the purpose of illustration, the following assumptions are made:
  i. the Web browser (of the user client) opens up to two parallel connections to the server;

ii. each object involves an RTT time of 1 second and a transfer time of 1 second, the transfer time of a request is negligible;
iii. the 6 objects of this Web page example are stored on domains different from the HTML page and thus require separate connections; and
iv. the time it takes a client to parse HTML and find the objects referenced in it is negligible and that at least two object references appear in the beginning of the data that is parsed.

A typical prior art Web page loading scenario would be as follows:
i. At time 0, client sends a SYN to server.
ii. At time 1, the server sends a SYN+ACK to client
iii. At time 2, client sends a request for HTML object
iv. At time 3, and until time 4, server answers with HTML object
v. At time 4, and until time 5, client receives the response and parses it on the fly.
vi. At time 4, client initiates 2 connections to objects domain (SYN)
vii. At time 5, server receives these SYN and answers with SYN+ACK
viii. At time 6, client sends requests for first 2 objects over the 2 connections.
ix. At time 7, and until time 8, server sends objects.
x. At time 8, and until time 9, client receives these objects.
xi. At time 9, client sends requests for additional 2 objects.
xii. At time 10, and until time 11, server sends objects.
viii. At time 6, client sends requests for 2 bundles over the 2 connections.
ix. At time 7, and until time 10, server sends bundles (note that to bundles are three times longer and therefore takes 3 seconds to transmit).
x. At time 8, and until time 12, client receives these bundles.
xi. At time 12, page is fully loaded.

Thus, using a bundling scheme and slight modifications to the HTML code, one can reduce the loading time of a simple Web page by more than 15%.

Modified HTML code that can be used for such bundling is exemplified below.

The original HTML code can be as follows:

```
<html>
<body>
<img src="http://www.server.com/m1.jpg"> </img>
<img src="http://www.server.com/m2.jpg"> </img>
<img src="http://www.server.com/m3.jpg"> </img>
<img src="http://www.server.com/m4.jpg"> </img>
<img src="http://www.server.com/m5.jpg"> </img>
<img src="http://www.server.com/m6.jpg"> </img>
</body>
</html>
```

Following modification using mhtml archiving, the HTML code can be as follows:

```
<html>
<body>
<img src="mhtml:http://www.server.com/B1.gif!2094671077/m1.jpg"> </img>
<img src="mhtml:http://www.server.com/B1.gif!2095594598/m2.jpg"> </img>
<img src="mhtml:http://www.server.com/B1.gif!2096518119/m3.jpg"> </img>
<img src="mhtml:http://www.server.com/B2.gif!2102059245/m4.jpg"> </img>
<img src="mhtml:http://www.server.com/B2.gif!2098365161/m5.jpg"> </img>
<img src="mhtml:http://www.server.com/B2.gif!2099288682/m6.jpg"> </img>
</body>
</html>
``` xiii. At time 11, and until time 12, client receives these objects.
xiv. At time 12, client sends requests for the remaining 2 objects.
xv. At time 12, and until time 13, server sends last two objects.
xvi. At time 13, and until time 14, client receives these objects.
xvii. At time 14, page is fully loaded.

Using the present approach, the 6 objects can be bundled into two bundles of 3 objects each and the HTML modified accordingly (bundles are made as binary MHTML for IE, JAR for Firefox or data URI for other browsers).

Using bundles, Web page loading would be effected as follows:
i. At time 0, client sends a SYN to server.
ii. At time 1, the server sends a SYN+ACK to client
iii. At time 2, client sends a request for HTML object
iv. At time 3, and until time 4, server answers with HTML object
v. At time 4, and until time 5, client receives the response and parses it on the fly.
vi. At time 4, client initiates 2 connections to objects (bundles) domain (SYN)
vii. At time 5, server receives these SYN and answers with SYN+ACK The modified HTML refers to two bundles, B1 and B2, served as "image/gif" content types. Each bundle has references to 3 resources (B1 contains m1.jpg, m2.jpg and m3.jpg; B2 contains m4.jpg, m5.jpg and m6.jpg). Within each bundle, the browser identifies the appropriate resource according to the tag located after the "!" character of the bundle URL: For m1.jpg it will search for "2094671077/m1.jpg" within the bundle data, etc. The bundle itself is served using the "multipart/related" content-type, for example:

Content-Type: multipart/related; boundary="--bundle_1"
----bundle_1
Content-Type: image/jpeg
Content-Location: 2094671077/m1.jpg
Content-Transfer-Encoding: binary
<<binary data of the m1.jpg>>
----bundle_1
Content-Type: image/jpeg
Content-Location: 2095594598/m2.jpg
Content-Transfer-Encoding: binary
<<binary data of the m2.jpg>>—
----bundle_1
Content-Type: image/jpeg
Content-Location: 2096518119/m3.jpg
Content-Transfer-Encoding: binary
<<binary data of the m3.jpg>>
----bundle_1--

Bundling According to Predicted Frequency of Objects being Changed

As is described herein, simple bundling of objects can be problematic in cases of selective use of objects. The following example describes the decision process involved in selecting objects for bundling and explains why the present invention utilizes predicted frequency of change in its bundling algorithm.

Assume 8 objects are bundled into 2 bundles. Assume that it is highly likely that 4 of these objects will change (marked as H1, H2, H3 and H4) while the other 4 objects are not likely to change (marked as L1, L2, L3, L4). Finally, assume that after 1 hour the Hx objects have been removed while the Lx are still used.

If the bundling algorithm does not take into account predicted change frequency and the first bundle includes H1, H2, L1, L2 while the second bundle includes H3, H4, L3, L4, a client accessing the Web page at T+1 hour needs to load both bundles to render the Web page (since L1, L2, L3, L4 are needed). If however, the bundling algorithm takes into account predicted change frequency and bundles the Hx objects in a single bundle and the Lx objects in a second bundle, a user client accessing the page at T+1 hour only needs to load a single bundle (with the Lx objects).

Prediction of objects changes over time can be effected by analyzing the HTML referencing these objects. In most cases, the basic HTML structure remains the same with only the references for objects changing over time. This enables collection of data and statistical analysis and generation of predicted change frequency for Web page objects.

Bundling Optimized for Avoiding TCP Window Closing

One of the parameters that affects bundle size is the avoiding a case where a client closes the receive window. This is likely to happen when the browser is busy and does not read data from sockets (e.g. executing JS). A client usually starts with a receive window of around 64 KB.

Assume a case where a client asks for a page composed of HTML with CPU consuming Java Script and 120 KB of objects which can be split to two groups of 60 KB and that this client uses a receive window of around 64 KB.

In a first scenario, with objects forming a single bundle of 120 KB, when the client loads the Web page it first loads the HTML, asks for the bundle and runs the JS. JS is CPU consuming and the Web browser does not read any data from the socket that receives the bundle. Therefore after receiving 64 KB out of the 120 KB of the bundle, the user client closes the receive windows and slows down the transfer. Later when JS execution is complete, the user client reads the bundle from socket and frees space for the transfer to resume. Bundle is fully accepted once the remaining 58 KB are loaded.

The present invention splits the 120 KB into two bundles of 60 KB. When the user client loads the Web page, it asks for two bundles and starts JS execution. Since the bundles are smaller than the receive window of the user client, they are fully transferred to the client while JS is executed. Once JS execution is over the browser reads the bundles which are already stored in the receive windows and does not need to wait for the transfer to resume.

Bundling Versions Optimized for Browser Cache

Assume that a user client loads a Web page that includes HTML and four objects A, B, C and D as a single bundle b1. When a server constructed in accordance with the present invention communicates the HTML to the user client, it provides an ETag or Cookie that reflects the version of the Web page. If later that Web Page changes to now include objects A, D, E and F, a new user client that accesses the page receives an HTML with a bundle that holds object A, D, E and F. However a user client that already includes bundle b1 in cache (identified by Etag or Cookie) will receive a version of the web page that uses A and D from bundle b1 (cached) and object E and F from a new bundle b1.1 which holds only objects E and F. Thus, in cases where a user client asks for an outdated bundle, the present system provides a portion of that bundle that includes the relevant objects.

Example 2—Connection Manager

Provided below are various use-cases of the Connection Manager of the present invention. Each use case illustrates a different advantage of using the present connection manager.

FIG. 1 illustrates a computing platform 100 according to an embodiment of the invention. The computing platform 100 can be a server but this is not necessarily so. The computing platform 100 may communicate with one or more clients over multiple connections and may be further arranged to communicate with a communication network that is coupled to content providers.

The computing platform 100 may include a controller module 110, a ConnectionManager module 120, a ConnectionsPriorityQueue module 130, a ResponseSubmissionTimeEstimator module 140 and a URL-replace module 150. The various modules of the computing platform 100 are coupled to each other.

FIG. 1 also illustrates a client 90 that is coupled to the computing platform 100 via communication network 120 and content providers (such as servers that host web pages) 70.

The Controller module 110 (also referred to as controller) may be the main network and processing framework. For example, it can be a java HTTP servlet executed by a tomcat service. The Controller operates as a TCP terminator, where it handles all incoming requests and outgoing responses. It uses the Connection Manager's API to control the order and pace of the responses sent to the end client. The ConnectionManager module 120 (also referred to as connection manager) is responsible on the flow cycle for each request/response. Upon a new request arrival, it interacts with the ConnectionsPriorityQueue to set its priority and stall it as required. Once the request is released from the queue—only after all other requests with higher priority were handled—the ConnectionManager releases its corresponding response. The ConnectionManager interacts with the ResponseSubmission module to get the best estimation as to when the response fully arrived to the end-client, so the next response (if exists) can be released.

Note, that in cases that a single TCP connection is not optimal in terms of filling the downstream with data, it is possible for the ConnectionManager to use more than one connection at a time, that is, to release from the queue two (or more) connections simultaneously.

The ConnectionsPriorityQueue module 130 (also referred to as Connection Priority Queue) is responsible for setting a priority for each HTTP request/response, stalling all requests/responses with lower priority and notifying the ConnectionManager which is the next response that should be sent to the end client. The priority setting may contain a complex logic, with several factors that affect the final priority.

Examples of factors that affect priority include:
i. Stylesheet resource—which can have a higher priority by default than a regular image (jpg) resource, as the browser requires all stylesheet objects to be downloaded before it start rendering the response.
ii. The arrival time of the request—the earlier the request arrives the higher its priority.
iii. The response's size—the smaller the response is the higher its priority, as we prefer to postpone longer responses to the end and serve smaller content resources first.
iv. The position of the resource within the visibility area of the browser—the visibility area is the area that the browser presents naturally (according to its resolution) without the need to scroll down. Resources that appear within the visibility area can/should have higher priority than resources that don't appear in the visible area, as they are visible and affect the end-user experience much more than resources that are not seen at first.
v. All these factors can and preferably should be combined into one priority, which reflects the level of interest of serving this resource first.

The ResponseSubmissionTimeEstimator module 140 (also referred to as ResponseSubmissionTimeEstimator) is responsible on estimating when a specific response has arrived to the end-client. The need for such a module is the result of the basic nature of TCP, where each party of the connection can be sure that the data has arrived to the second party only upon an explicit acknowledgment of the other party. Therefore, the trivial way to identify that the response had fully arrived to the end-client is to wait for its TCP acknowledgements. This method, however, may result is expensive delays, again, due to TCP behavior. Additional methods that can be used include:
i. Use of server-side estimation which is based on the response's size and the estimated end-client bandwidth utilization. For example, if the response's size is 100 KBytes, the end-client bandwidth is 1.5 Mbits/s and it utilizes 90% of it, then it is expected for the end-client to take (100*8)/(1500*0.9)=0.593 seconds to download this resource. The bandwidth estimation (and if required, the RTT estimation) can be retrieved from previous TCP connections, and can be stored locally, or even on the client-side using a Cookie header.
ii. Use of a client-side notification other than the TCP's acknowledgements. For example, a dedicated HTTP request to the Controller that is triggered by the end-client's browser once the response has arrived should work well. In order to initiate such a request, the HTML code (that is sent to the end client) should be changed. The URL-replace module is responsible for it.

The URL-replace module 150 (Also referred to as URL-replace) is responsible on modifying the HTML response code so that we can gain benefits from the client-side browser. Such modifications can include, among other modifications, changing of URLs to different URLs (so we can route URLs to our service if needed) or adding JavaScript code in the client-side that initiates requests to resources that we construct. The Controller uses this module for each HTML response before it sends it to the end-client.

FIG. 1 illustrates the interaction of these modules during request/response handling. Numbers 1-7 illustrate various stages in the process.

"1" The request arriving from the client to the controller module. "2" In case it is an HTML resource, the URL-replace module may manipulate the response. "3" The Controller module interacts with the ConnectionManager module, which takes ownership over this connection. "4" The ConnectionManager module queries the ConnectionPriorityQueue module for the request's (connection) priority, and inserts it to the queue. It is released only if all other connections with higher priority were already handled. (Or if the queue is empty and there is no response download at the moment). "5" The ResponseSubmissionTimeEstimator notifies the ConnectionManager once it estimates that a specific request was fully downloaded. The ResponseSubmissionTimeEstimator can perform server-side estimations, or get an external notification from the client (a special request that arrives the Controller and directed to the ResponseSubmissionTimeEstimator). "6"+"7" Upon a notification from the ResponseSubmissionTimeEstimator, the connection manager extracts from the ConnectionsPriorityQueue the highest priority connections available, and its response is sent back to the client (via the Controller).

In the examples below, the following assumptions apply: the user client has a downstream bandwidth of 2.222 Mbits/s (2/0.9); the bandwidth utilization is 90%, hence the actual download pace is 2 Mbits/s; the bandwidth represents the (only) bottle-neck of the path between the client and the server. (All the examples ignore the RTT impact in the time calculations); the client uses a user-agent (browser) that is capable of opening 6 concurrent connections for each domain. Such a browser can be Internet Explorer 8 or Firefox 3.6; and objects are rendered (by the browser) once they are fully received. The server's domain address is represented in these examples as www.server.com.

Connection Manager—Progressiveness

The following example illustrates browser loading scenarios of a Web page (http://www.server.com/) which contains 4 images, m1.jpg, m2.jpg, m3.jpg and m4.jpg in addition to the HTML itself. For the sake of simplicity, each image is 64 Kbytes in size.

Without the ConnectionManager feature of the present invention, the browser opens 4 concurrent connections and submits 4 requests, http://www.server.com/m1.img; http://www.server.com/m2.img; http://www.server.com/m3.img; and http://www.server.com/m4.img.

These 4 resources are then sent in parallel over the link. As the overall size of these 4 images is 64*4=256 Kbytes=2 Mbits, and the bandwidth is 2 Mbits/s, it will take 1 second to transfer the entire set of images to the user client. At the user client, following 1 second of wait, all 4 images appear simultaneously in the user agent (Web Browser).

Using the ConnectionManager of the present invention, the same 4 requests arrive at the Controller, which invokes the ConnectionManager. The ConnectionPriorityQueue assigns each request a priority (or simplicity sake, assume they all have the same priority). All 4 requests are added to the queue, and as they all have the same priority, m1.jpg is chosen to be served first (arbitrary). The 3 other connections are halted, and no data is sent on these connections yet. As m1.jpg size is 64 KBytes=256 Kbits, it takes 250 ms to transfer this amount of data over the network with an actual 2 Mbits bandwidth.

After 250 ms the browser finishes downloading m1.jpg, and it presents the image to the user. On the server side, the ResponseSubmission module notifies the ConnectionManager that the response has fully downloaded, and the ConnectionManager polls the next response from the ConnectionPriorityQueue. The procedure is now similar to the first image served, where each image takes 250 ms to download, and is rendered and presented once it is downloaded.

So, in total the first image was presented after 250 ms, the second after 500 ms, the third after 750 ms and the last image after one second. This stepwise presentation of Web page content to the user provides an earlier feedback as to site content and is a major improvement to the delayed response of prior art approaches.

Connection Manager—Visible Area and Order of Objects

The following example illustrates browser loading scenarios of a Web page (http://www.server.com/) which contains 12 images, m1.jpg . . . m12.jpg in addition to the HTML. The size of each image is 64 KBytes.

The visible area is constructed of the odd-numbered images, m1.jpg, m3.jpg . . . , m11.jpg. A browser is not aware of the visible area concept, and requests the resources according to its own decision logic, usually in correlation to the appearance of the resource in the HTML code, which many times is not correlative to the visibility characteristics.

Therefore, the scenario without the Connection Manager of the present invention is that the browser starts requesting m1.jpg, m2.jpg . . . m11.jpg, m12.jpg. Since it can open 6 concurrent connections, m1.jpg to m6.jpg will be requested first, and served in parallel. It will take 64*6*8/2048=1.5 seconds for these 6 images to be downloaded. Following downloading, these 6 images will be rendered and the next 6 requests for m7.jpg . . . m12.jpg are issued. Again, it takes another 1.5 seconds to download these images. Thus, 3 seconds are required to download the resources, and only at the end of these 3 seconds the user sees the full page.

A system using the connection manager of the present invention executes a completely different serving scheme. The URL-replace module changes the original HTML response code so that the browser will request the resources in the "desired" order—the resources that appear in the visible area are requested first. So the first 6 requests are for m1.jpg, m3.jpg, m5.jpg, m7.jpg, m9.jpg and m11.jpg. Each resource is downloaded solely (as described in the previous example) and as such, within 1.5 seconds the end-client can see the full page, even though half of the resources were not downloaded yet.

Note, that the URL-replace modification is not mandatory for the ConnectionManager to work well. Even if the original order of the requests (m1.jpg, m2.jpg . . . ) is maintained, the same result will be achieved. At first, 6 requests are issued, m1.jpg, m2.jpg . . . m6.jpg. All 6 requests are inserted into the ConnectionsPriorityQueue, where m1.jpg, m3.jpg and m5.jpg receive a higher priority than m2.jpg, m4.jpg and m6.jpg, due to the visibility characteristic. So, m1.jpg is served first and once it is downloaded (250 ms) the ResponseSubmission notifies the ConnectionManager to poll the next response from the queue, which is m3.jpg. Since m1.jpg is already downloaded, the browser submits yet another request, for m7.jpg which has a higher priority than m2.jpg or m4.jpg. Once m3.jpg is served (250 ms), the browser issues another request, for m8.jpg. At that time, the ConnectionPriorityQueue contains m2.jpg, m4.jpg, m6.jpg and m8.jpg with low priority, and m5.jpg and m7.jpg with higher priority. These two images are served next (each one takes 250 ms to download). M9.jpg is now served, and the next request that the browser submits is for m11.jpg, which is served instantly as it is the lowest priority in the queue. After m11.jpg is downloaded, the browser holds 6 connections that wait for responses, for m2.jpg, m4.jpg . . . m12.jpg. The ConnectionManager retrieves the next request from the ConnectionsPriorityQueue, and starts releasing m2.jpg and so on.

Another capability that the URL-replace module has, is to change the domains of the URLs. In that sense, it is possible to split the 12 requests (m1.jpg . . . m12.jpg) into two domains, so that the browser would be able to submit 12 concurrent requests (6 for each domain). In that case, the queue will have all 12 requests from start, and the higher prioritization of m1.jpg, m3.jpg . . . m11.jpg will result in the same rendering scheme described above.

Connection Manager—Delaying $3^{rd}$ Party Resources

In many cases a page contains content which is not delivered from the site that is served by the present system. Obviously, when such $3^{rd}$ party resources are downloaded they still consume an end-client's bandwidth, and therefore it would be prudent to control serving of such connections as well, giving each such request the appropriate priority and directing the browser to optimize downloading and rendering.

The following example illustrates how the ConnectionManager feature of the present invention can be used to control such 3rd party resources.

An exemplary Web page (http://www.server.com/) includes 4 images (m1.jpg . . . m4.jpg) 64 KBytes each and 2 flash banners that are served from a 3rd party domain, www.3rdparty.com in addition to the HTML. These two flash movies are http://www.3rdparty.com/s1.swf and http://www.3rdparty.com/s2.swf and are 128 Kbytes each.

Without the ConnectionManager of the present invention, the browser opens 4 concurrent connections to www.server3.com and requests m1.jpg . . . m4.jpg and at the same time opens 2 additional connections to www.3rdparty.com requesting s1.swf and s2.swf. These 6 resources are served simultaneously, it takes 1.5 seconds to download the 4 images and half of each flash movie (at this time the 4 images are displayed in the browser) and an additional 0.5 seconds to complete the download of the flash movies once the 4 images download is completed (and the network could be utilized to download only the remaining of the flash movies).

When using ConnectionManager the URL-replace module identifies the two 3rd party resources, and changes their URL so that the requests will be directed to the present system (e.g. dedicated server). Thus, instead of http://www.3rdparty.com/s1.swf the URL might look like http://www.server.com/s1.swf? special_identifier, where "special_identifier" identifies to the present system that this is a 3rd party resource. Once the end-clients receive the modified HTML code, the browser generates 6 simultaneous requests, for m1.jpg . . . m4.jpg, s1.swf?special_idenfifier and for s2.swf?special_identifier, all to the same domain (that of the present system).

The ConnectionManager handles these requests according to their priority, where in this case since the 3rd party requests are flash banners, their priority will be lower than the rest of the images. Thus, the 4 images will be served first (in the same manner as described above) and each downloaded in 250 ms. The two $3^{rd}$ party requests are handled only following downloading of the 4 images.

The present system can not serve a response for these requests since the content originates in a $3^{rd}$ party server not connected to the present system. Therefore, The ConnectionManager's response to these requests contains a redirection response (using HTTP status code 302) to the original $3^{rd}$ party request. The browser to then follows the redirections instructions, and requests the original http://www.3rdparty.com/s1.swf and http://www.3rdparty.com/s2.swf requests (from the 3rdparty server). As the download link is now dedicated to these two flash requests, it takes 1 second to download these two resources in parallel.

As a result of using the ConnectionManager of the present invention, the 4 images of the web site are displayed much faster.

Connection Manager—Working with Intermediate Proxies

In some cases the original server operates through intermediate proxies such as CDN (Content Delivery Network). In such cases, the CDN server will be responsible for serving all the static content, such as the multimedia files. As the CDN acts as a cache-server, it will address the origin server only rarely, and in most cases will serve the static content out of its own cache. In such cases, multimedia requests will not go through the present system and the ConnectionManager solution described herein will not be applied, since only the dynamic HTML code itself will be served by the present system. A standard CDN doesn't manipulate the content nor the order of the responses, resulting in parallel download as explained in the previous examples In order to cope with CDN serving, the request flow chart should be modified as follows.

The URL-replace performs the following changes for every resource that originally is directed to the CDN:
i. It changes the URL so that the request will be directed to the present system, similar to the process described in the previous example with 3rd party resources. So, if in the HTML the image URL was originally identified as http://www.cdn.com/m1.jpg, it is now converted to http://www.server.com/m1.jpg? special_identifier.
ii. A client-side script (JavaScript segment) is injected, that loads the original request from the CDN. (for example, http://www.cdn.com/m1.jpg). This script also notifies the present system of download completion of the resource from the CDN. This notification is done via a fictitious request to the present system that indicates the resource that was downloaded. (for example: http://www.server.com/notify?url=http://www.cdn.com/m1.jpg). Note, that the JavaScript code verifies that each such resource is downloaded solely from the CDN, and in a predefined order. (Which reflects the prioritized order enforced). The converted HTML might therefore look something like the original HTML:

```
<html>
<body>
...
<img    src=http://www.cnd.com/m1.jpg>          </img>
<img    src=http://www.cnd.com/m2.jpg>          </img>
...
Converted HTML:
<html>
<head>
<script>
//special JavaScript code that loads m1.jpg and m2.jpg originally
//from the CDN, in a determined one-by-one order.
</script>
<body>
...
<img    src=http://www.server.com/m1.jpg?special_identifier>    </img>
<img    src=http://www.server.com/m2.jpg?special_identifier>    </img>
...
```

Once the converted HTML is processed by the browser, two types of requests are generated: Requests to the CDN of the original resources (by the JavaScript code) and equivalent requests to the present system. Each request to the present system is halted and not released until the notification that the corresponding request from the CDN ended.

Using the approach described above, the present system can achieve the following: (a) The original content that should be retrieved from the CDN is downloaded in the required order and pace, and is stored in the local browser's cache. Note, that these resources/images are not presented anywhere, as the requests were sent by the dedicated JavaScript code of the present system, which is out of the scope of the entire HTML flow and UI. (b)

The original requests that should have been directed to the CDN are now manipulated (stalled) by the ConnectionManager, and released only when the corresponding CDN request is completed. The response in that case is similar to the 3rd-party response: it is a redirection to the original resource, only that this time this original resource (from the CDN) is already stored in the local cache and the browser can retrieve it instantly.

The following example illustrates such a scenario with a Web page (http://www.server.com/) that contains (in addition to the HTML) 4 images (m1.jpg . . . m4.jpg) 64 KBytes each typically served from the CDN.

Without ConnectionManager, the browser opens 4 simultaneous connections to the CDN server, and requests http://www.cdn.com/m1.jpg . . . http://www.cdn.com/m4.jpg. The CDN returns the 4 replies; it takes the browser 1 second before it presents these images. (Note that the RTT times are ignored in this case since this is a benefit of using a CDN).

Using ConnectionManager, the HTML is converted as described above. The browser opens 4 connections to the present system (server), requesting http://www.server.com/m1.jpg?special_identifier . . . http://www.server.com/m4.jpg?sp ecial_identifier. All these requests are simply added to the ConnectionsPriorityQueue (without any priority tagging) and are stalled. At the same time, the browser submits one request to the CDN server, http://www.cdn.com/m1.jpg, and it takes about 250 ms to download it. At this point, this resource is only kept in the browser's cache, and not presented. (As it is out of any UI context). Once it is downloaded, the JavaScript initiates a special notification request to the present system, http://www.server.com/notify?url=http://www.cdn.com/m1.jpg. At the moment this notification arrives, the present system releases the request for http://www.server.com/m1.jpg?special_identifier and the response is a redirection assigning this request to the original CDN request, that is http://www.cdn.com/m1.jpg. When the browser follows this redirection instruction, it retrieves the already cached resource from its local cache instantly, and presents this resource on the page.

Therefore, the time it takes the browser to present this image is the 250 ms download time (of the original content)+RTT, the time it took the notification to arrive at the present system and the time it took the redirection response to get back to the browser. The same procedure takes place with respect to the rest of the images (m2.jpg, . . . m4.jpg) where m2.jpg will be presented after 500 ms+RTT, m3.jpg after 750 ms+RTT and m4.jpg after 1 second+RTT. (The reason the RTTs are not accumulated is that the browser continues downloading the requests from the CDN server regardless of the notification requests that are submitted to Present system)

Example 3—Automated Optimization Level Selection

This example illustrates a method for checking which content-intrusive optimizations can be applied for a given page with a given browser. Optimizations are associated to levels of risk determined according to the change to page content or to the ay a page is rendered.

The present system can be used to build an alternate set of page components for each optimization level by applying all the optimizations up to this level on the original set.

Modified page components are injected into a browser and checked for changes in an end-result (rendering and content).

Comparisons to the original Web page is effected using bitmaps which are generated from a snapshot of the page render (snapshot of the entire page, not only visible area). The effect of object on a page is minimized by following these guidelines:
  i. Animated images—only an image that shows only first picture is used.
  ii. Flash—flash content is injected, but the browser is instructed not to execute the code.
  iii. Java script errors and warnings, CSS errors and warnings, XML errors and warnings, XML and HTTP Requests (XHRs) and Chrome messages are compared to verify that they are the same across platforms.

The system allows the end-user to configure the optimization level per to page even though its automatic comparison show that the end result is not the same.

Example 4—Ajax Based Delta Content Fetcher

With this optimization the present system distinguishes, in the learning phase, between the common part of a dynamic response and the changing part. When a request to a dynamic object is received, the present system answers immediately with the skeleton and AJAX that will ask for the dynamic portion. In parallel it asks for the object from the server. When the ajax request arrives it answers with the dynamic portion. This accelerates the progressiveness of loading the page.

For example assume that a browser asks for a page "/greeting.html?name=name" and gets a response of "hello full name. I hope you are doing very well today". For example getting "/greeting.html?name=john" results in "hello john smith. I hope you are doing very well today" while getting "/greeting.html?name=mike" results in "hello mike green. I hope you are doing very well today". When the present system is not used it takes time for the entire response to be generated as it typically uses DB access to convert a name into a full name and only then send the entire response. With the present system, a client that asks for "/greeting.html?name=john" immediately gets a response "hello. I hope you are doing very well today" and an AJAX script that asks the present system for the missing name. In parallel the present system asks for "/greeting.html?name=john" from origin server. When the present system gets the response "hello john smith. I hope you are doing very well today" from server it answers with the AJAX response that converts the original response into "hello john smith. I hope you are doing very well today." i.e. changing the missing name to "john smith".

This example describes changes to plain text in HTML, however this mechanism can also be used for all dynamic portions of a page.

Example 5—Snapshot

This example show how the present system may handle pages whose load time is long. During learning phase, the present system loads the Web page and identifies rotating objects (i.e. objects that are different on each page load). The system activates a browser that renders the page and takes a snapshot of it i.e. it generates a digital image of the page.

Next the present system modifies the pages so that the snapshot image is displayed in background and the real objects are loaded in the foreground, when the page first loads, a non-interactive image is displayed. The system may stall transfer of the real objects in order to minimize the transfer time of the background image. In addition, the present system can mark the background image or each of the object images, to enable the end-user to recognize these as non-interactive. Such marking is then removed once an object becomes interactive.

The present system handles rotating objects in one of the following ways:
  i.—It does not render them in the background image and let's them be added later.
  ii.—It maintains few version of the page and manages the rotation by itself so that some clients will get one version of the page while other clients will get other version(s). In this case the background images includes rendering of the objects that are served to clients.

Example 6—Change Charset

When the present system detects a page with charset not optimized for browser in term of size (i.e. the client accepts charset that can represent page content but takes less space than charset originally used by page), it converts charset to one of reduced size. For example, a page written with charset UTF-8 can be converted to windows-1255 by the present system to reduce transfer and render times.

The present system checks the page content before converting charset, multilingual pages are typically harder to code using a specific code-page but they are rarer.

Example 7—Background Learning of Common Response to Dynamic Object

There are cases where requests to the same resource generate the same reply, even if the request contains unique argument values. For example, the resource answer.html?user=john&answer=OK may always return "your answer has been accepted" regardless of the "user=john" parameter that appears in the query string. The present system can identify such cases and immediately return the cached (expected) reply even before the request is sent to the original server; the request will still be forwarded to the server for executing the necessary logic. This reduces the response time since it negates the need to wait for the server's backend execution.

Example 8—Background Learning of Uneven Distribution of Dynamic Requests

Assume a case in which the object home.html is a dynamic object that accepts a user_name when a user is logged and user "null" when a user is not logged. Assume that the present system identifies that 60% of the requests to home.html come as home.ntml?user=null while only 40% comes with different user names. In this case the present system can cache the response for the common case while asking the server to answer the rarer cases where a user name is specified.

Example 9—Background Learning of Typical Navigation Path and Pre-Fetching

The present system can examine client statistics to identify that a client that loads a given page p1 is likely to go on to page p2 (60%) p3 (20%) or leave the site (20%) and that p1 'think time' is long. In this example the present system may add script to p1 that automatically loads p2 following completion of p1 loading and thus use the think time of the client to shorten the time it will take to load p2.

Each of the mentioned above methods can be implemented by a computerized entity that executes instructions that are stored in a non-transitory computer readable medium such as a disk, diskette, tape, memory chip, and the like.

Bundeling

According to various embodiments of the invention, some illustrated above. Objects are not transmitted one at a time but rather are bundled. The computing platform 100 can perform the bundling based on various parameters, some of which are listed below:

i. Visibility in client's browser window (below/above fold) and exact y position, wherein the client is expected to view a so-called visibility window that may be smaller than the web page and the lower limit of the visibility window can be referred to as a fold—the bundling can include prioritizing the bundling of objects that are included in the visibility window.

ii. Resource dynamics within a webpage and commonalty between web pages. This may include generating separate bundles for different levels of dynamics, for example a bundle to with short-life time span holding images that are present in a page for a very short time or even only once and up to highly static images that almost never change in a page. Another example is images which are common among different pages (like logos or grid lines).

The bundling can be subjected to size limitation—the size limitations may be determined based on both network devices (such as modems) common buffer size and clients operating system TCP buffer set in kernel. For example, a size limitation can be selected to be about 32 k bytes.

In case a web page is to be delivered to a specific end-user and the webpage is found to contain URLs of images that were already delivered to this end-user in the past maybe by another webpage ("common image"). The URL of those images can be replaced, by the computing platform 100, with the historic bundle instance url (so that the coherency of the page will not be violated)(which held them and assumed to exist in the specific end-user cache. That can be done by using server repository that keeps track on all bundles versioning (list of contained images) and a client cookie holding the list of all bundles received at the client. This client cookie can be set to reflect the end-user cache contents for every response of a bundle (assuming a reasonable cache aging period). In case of misses the request for historic bundle will arrive to the server and can be built from scratch and served on-the-fly from the versioning repository. It is noted that other methods for storing state information of client cache can be applied—event such methods that do not use client cookies.

Web Page Transformations

According to an embodiment of the invention the computing platform 100 can perform various changes in the web page it receives to provide a modified web page that is then sent to the client.

This method of loading helps making sure that the more relevant resources will arrive to server for prioritization and further enhance the progressiveness:

The web page transformation assist in controlling the client web browser's standard requesting behavior by temporarily replacing page resources URLs with dummy or wrapper resources as follows:

1. Images based on their visual position and categorization of usage (visibility etc.) with a dummy image (1×1 transparent pixel)
2. IFRAMEs based on their visual position and categorization of Advertisements vs. Content with a blank URL. Categorization is made by predefined list of known ads URL patterns and/or configuration
3. $3^{rd}$-party IFRAMES (pointing to external URLs) are temporarily redirected to Aragon server (wrapper url) to control its prioritization also based on their visual position and then redirects (HTTP 301/2) back to original URL Embed prioritized list of resources (images and bundles) each on different (fixed) sub-domain aliases (for example: c1.website.com, c2.website.com, c3.website.com, etc. where c1.c3 are the sub-domain aliases) these sub-domains are driven from the URL of the web site of interest and they cause the browser to open at least two TCP connection per each sub-domain aliases and therefore increase the overall number of TCP connections that are opened by the client agent (based on configured amount of total available). By using different sub-domains will not only enable multi-connect but also maximize the push to client kernel while browser busy (because a new kernel TCP buffer is grunted for each TCP connection)

Figure 2:
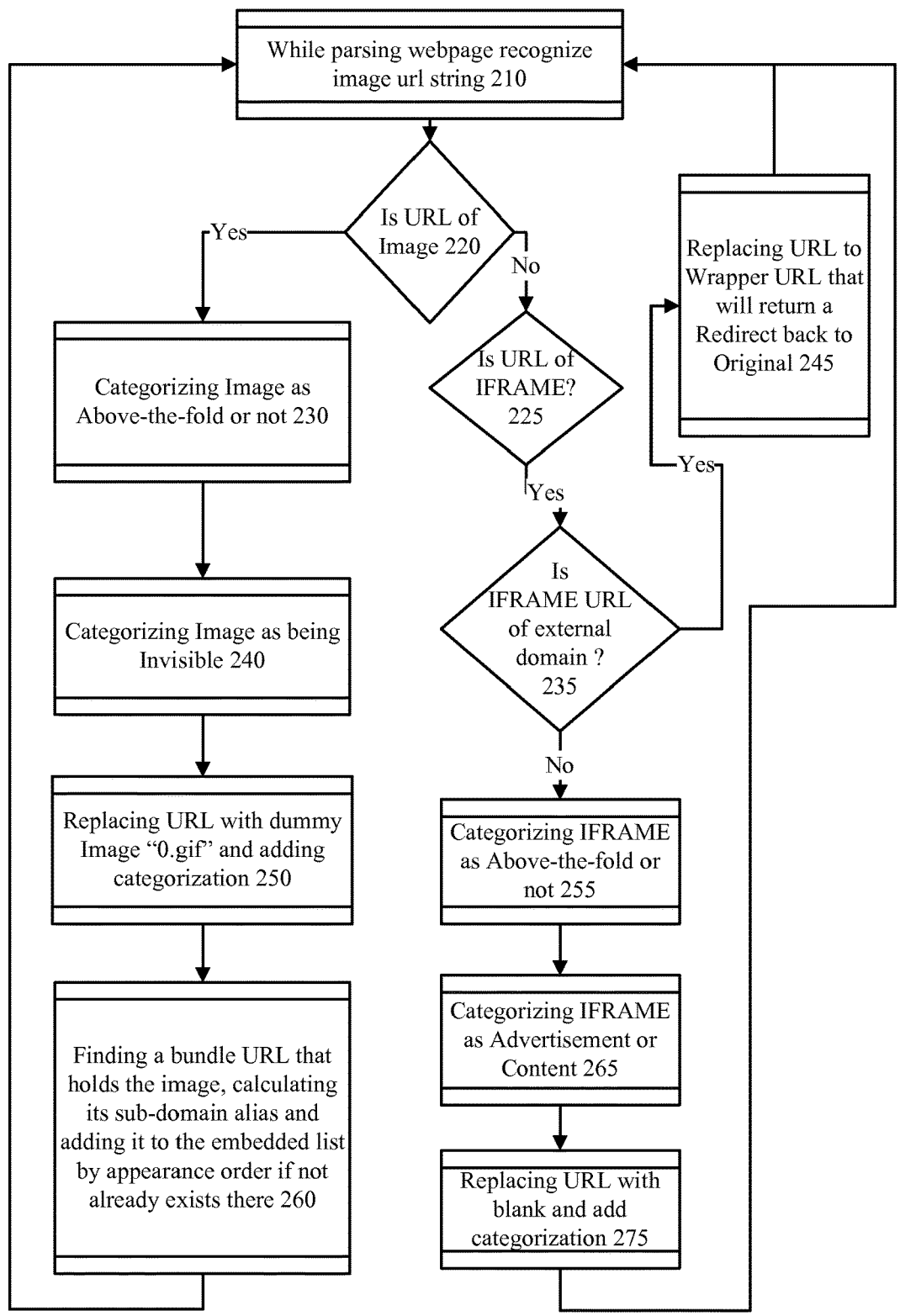
FIGS. 2-3 are flow charts of methods according to various embodiments of the invention.

FIG. 2 illustrates method 200 for web page transforming according to an embodiment of the invention.

Method 200 starts by stage 210 of recognizing an image URL string while parsing a web page.

Stage 210 is followed by stage 220 of checking if the URL is of an image.

If yes then stage 220 is followed by stage 230 of categorizing the image as above the fold or not (in or out the visibility window) 230, stage 240 of categorizing the image as being invisible or not (this could be done by running small JavaScript code that detect it and embed it once a end-user gets into a new page template or use server side browser emulator) an invisible image is an image that can be displayed only if a certain actions is taken by the user (for example—hidden control buttons), stage 250 of replacing a URL with dummy image "0.gif" (in order to have control over a loading process of the dummy image) and adding categorization, and stage 260 of finding a bundle URL that holds the image, calculating its sub-domain (to make it persist among different server clusters and restarts—for example by use some hash code) alias and adding it to the embedded list by appearance order if not already exists there.

If the URL is not of an image then stage 220 is followed by stage 225 of checking if it is the URL of an IFRAME (in the server parser) and if so—continuing to stage 235 of checking if the URL is an IFRAME URL of external domain ? (third party) if so then stage 235 is followed by stage 245 of replacing URL to Wrapper URL that will return a Redirect back to Original. Stage 245 is followed by stage 210.

If no—stage 235 is followed by stage 255 of categorizing IFRAME as Above-the-fold or not 255, by stage 265 of categorizing IFRAME as Advertisement or Content, and by stage 275 of replacing URL with blank and add categorization 275.

Stage 275 is followed by stage 210.

Upstream Requests Manager

The client agent can assist in controlling the client side resources loading process to prevent upstream congestion and pre-fetch resources regardless of browser rendering activity (Uninterruptable network utilization).

If external CDN is in use and server side prioritization of object loading is not available then instead of dispatching new request every time period the client agent waits for the previous image to signal an "onload" event (event that a browser send when it completes loading an object), only then the client agent dispatches the next successive image request (it is also sufficient in most cases to do that only to the above the fold resources).

A client may iterate on sorted list (of objects of a web page) and every time period (for example ~20 ms) issue a new request to load a resource. That is done to prevent congestion on the upstream. Note that the actual network response order is controlled by the server and not the client.

A client may detect and mark when an image or bundle were loaded. Bundles can be verified to completely load by using a dummy (1×1 pixel) image at the physical end of each bundle and listening to the "onload" event of it.

Client Listens on each dummy image loading event to mark the image as ready and rendered on page DOM before replacing it with actual image.

When both the resource was loaded and the DOM of an image holder are ready then replace the dummy resource back to the desired resource URL.

Response Prioritization

The server side prioritization is activate when no external CDN is used to host the resources (such as the bundles).

The computing platform 100 can perform one or more of the following stages: (a) lack of TCP slow start, (b) do not wait for TCP ACK, (c) serving a single connection at a time, (d) priority based provision of objects, (e) timing estimation and bandwidth evaluation based transmission of objects (or bundles of objects).

In order not to lose the RTT time caused by the latency when waiting for ACK and being able to fully utilize the bandwidth. This in particular important because standard parallel concurrent HTTP responses are no longer feasible in the system. Therefore the computing platform 100 may disable the TCP Slow-start algorithm and not wait for ACKs before sending the packets (a simple method could be changing the Initial congestion windows size INITCWND to the bundle maximum size, for example ~32 k). The TCP Slow-Start is no longer critical for responses which are limited by buffer size and are grunted to be delivered solely to a client. However it is still important to wait in between response or between parts of large responses (over the buffer size), this is done by estimating the bandwidth.

Although many TCP connection are used to connect (by the sub-domains aliases) to the computing platform only one connection is actively sending response at any given time. That is to prevent resources from sharing the limited bandwidth and make sure only prioritized resource loads first and at the shortest possible time The computing platform can use a Priority Queue to send the most important response back to the client out of a queue of all pending requests received at computing platform from the client The computing platform can send the response packets while sniffing the ACKs that are returned back and while detecting possible packet-loss. Sniffing could start even while the HTML is sent.

The computing platform can estimate the client latency for example by to using the OS estimated RTT (the kernel in Linux systems already estimates it from the 3-Way-Handshake and or TCP Timestamps).

The computing platform can estimate the current (actual) Bandwidth by dividing the amount of data sent in the response by the time the corresponding ACKs arrive to computing platform after subtracting the estimated latency time The computing platform can define a sleep delay. Thus, before sending a next response the computing platform can make a sleep delay of up to the total bytes that were sent divided by the estimated bandwidth and abort this sleep delay only if all ACKs of previous response already arrived or the TCP connection was reset.

The computing platform can continue to sniff the ACKs of all responses in background and monitor when a response actually ends after all ACKs finally arrive to validate our initial time estimation based on the last estimated bandwidth. So that the computing platform can refrain from sending the next response in case there are active responses with unACKed packets for a time period longer than the transfer time estimation plus the RTT.

The computing platform can define the resources loading order (could vary based on customer preference) which is controlled by server (and also partly by client). The following order is a non-limiting example of such an order, starting from higher order (higher priority objects):

i. For maximal progressiveness to end-user of webpage rendering The computing platform can control both CSS and JavaScript and prioritize them based on actual page rules or code usage and known browser rendering behavior (CSS before JavaScript, etc.). Note that additional methods such as "inlining" them and post-loading unused CSS rules and unused JavaScript code are also used, in particular methods which are able to run JavaScript code at any given time in the browser rendering stages.

ii. The computing platform can load above the fold images each prioritized mainly based on its visual positioning within client browser window iii. The computing platform can load above the fold content IFRAMEs (load order could be configured).

iv. The computing platform can return redirect original URL of $3^{rd}$-party IFRAMEs which are above the fold (load order could be configured).

v. The computing platform can load below the fold images (load order could be configured).

vi. The computing platform can load above the fold ads IFRAMEs (load order could be configured)

vii. The computing platform can return redirect original URL of $3^{rd}$-party IFRAMEs which are below the fold (load order could be configured)

viii. The computing platform can load below the fold content IFRAMEs (load order could be configured)

ix. The computing platform can load below the fold ads IFRAMEs (load order could be configured)

x. The computing platform can load unused or invisible images.

Figure 3:
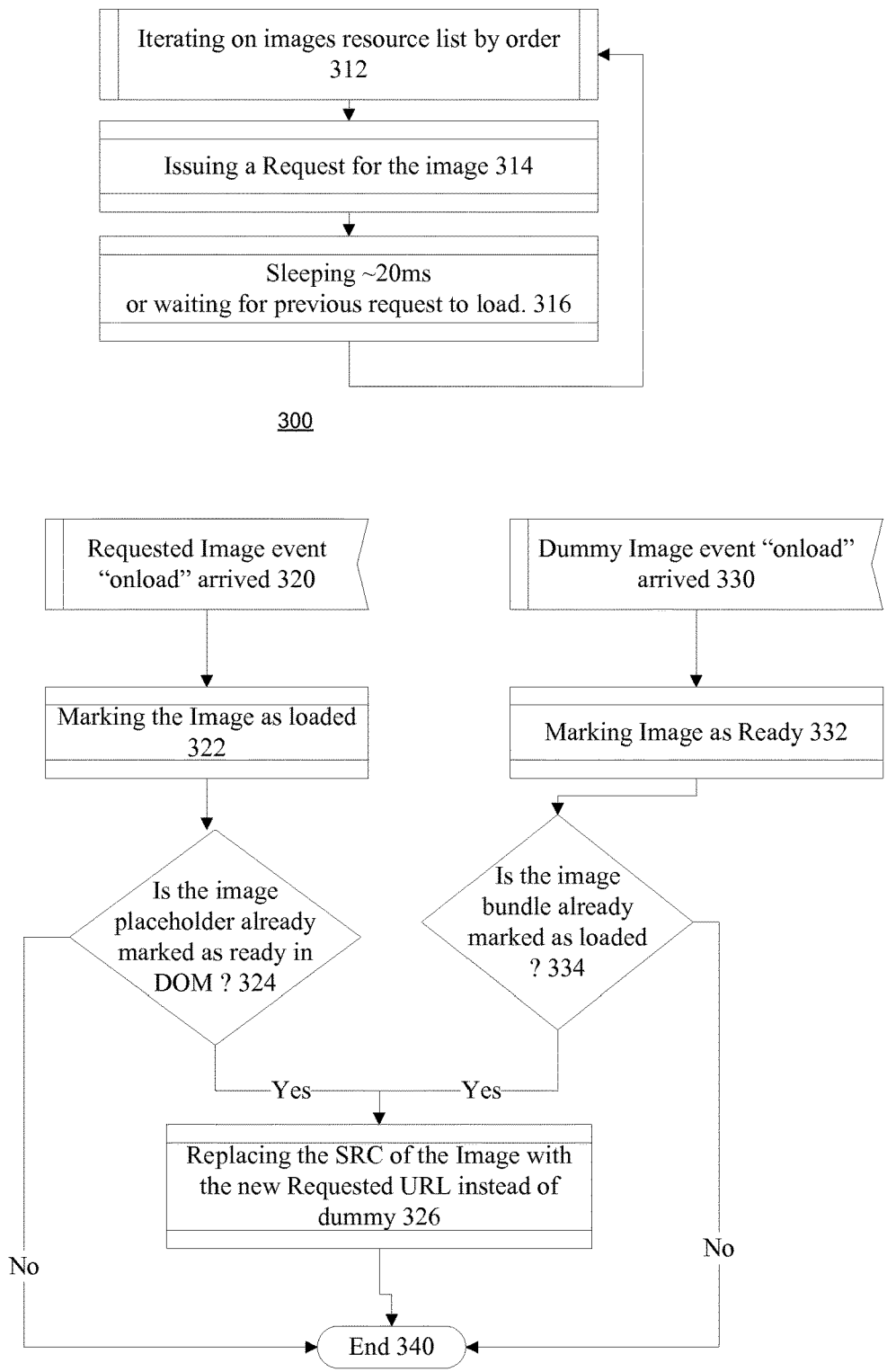

FIG. 3 illustrates method 300 for sending requests by a client and method 301 according to various embodiments of the invention.

Method 300 includes a repetitive sequence of stages 312, 314 and 316.

Stage 312 includes iterating on images resource list by order.

Stage 314 includes issuing a request for the image.

Stage 316 includes delaying the transmission of a new request sleeping for a predetermined period (for example— about 20 ms) or waiting for previous request to load.

Method 301 may start by stage 320 or 330. Stage 320 is followed by stage 322 that in turn is followed by query stage 324. Stage 330 is followed by stage 332 that in turn is followed by query stage 334. If the answer to query stage 324 is positive then the method proceeds to stage 326 that is followed by END stage 340. If the answer to query stage 334 is positive then the method proceeds to stage 326 that is followed by END stage 340.

If the answer to query stage 324 is negative then the method proceeds to END stage 340. If the answer to query stage 334 is negative then the method proceeds to END stage 340.

Stage 320 includes an event of requested Image event "onload" arrived.

Stage 322 includes marking the image as loaded.

Stage 324 includes determining if Is the image placeholder already marked as ready in DOM.

Stage 330 includes an event of dummy image event "onload" arrived.

Stage 332 includes marking the image as loaded.

Stage 334 includes determining if Is the image bundle already marked as loaded.

Stage 326 includes replacing the SRC of the Image with the new Requested URL instead of dummy 326.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A web proxy apparatus comprising a memory comprising programmed instructions stored thereon and a processor coupled to the memory and configured to execute the stored programmed instructions to:
    parse source code of a web page retrieved in response to a first request from a client for the web page, wherein the source code comprises a plurality of references each to at least one of a plurality of objects and the first request is received via one or more communication networks;
    identify, from two or more of the plurality of references and based on one or more characteristics of each of the plurality of objects, a first subset of two or more of the plurality of objects to include in a first bundle;
    obtain the first subset of the plurality of objects from one or more servers and via another one or more of the communication networks, assemble each of the first subset of the plurality of objects into the first bundle comprising a single object having a filename, and store the first bundle in the memory;
    modify a subset of the plurality of references of the source code of the web page that correspond to the first subset of the plurality of objects to insert the filename of the single object of the first bundle into a Uniform Resource Locator (URL) of each of the subset of the references;
    send the web page with the modified subset of the plurality of references of the source code to the client via the one or more communication networks and in response to the first request;
    receive a second request from the client via the one or more communication networks for the first bundle comprising the first subset of the plurality of objects, wherein the second request includes the filename and the first subset of the plurality of objects comprises two or more of the plurality of objects; and
    send the first bundle including the subset of the plurality of objects to the client via the one or more communication networks and in response to the second request.

2. The apparatus of claim 1, wherein the first subset of the plurality of objects is identified based on a predicted change frequency of each of the first subset of the plurality of objects.

3. The apparatus of claim 1, wherein the first bundle is generated to have a size not greater than a receive window of a web browser executed by the client.

4. The apparatus of claim 1, wherein the first subset of the plurality of objects are within a visibility area of a window of a web browser and the processor is further configured to execute the stored programmed instructions to modify the source code of the web page to include loading instructions that are configured to cause the web browser to send the second request for the first bundle prior to a third request for a second bundle comprising a second subset of the plurality of objects that are outside the visibility area of the window of the web browser.

5. The apparatus of claim 1, wherein the first bundle is optimized for a cache of the client using at least one of an e-tag or cookie derived information.

6. The apparatus of claim 1, wherein the first subset of the plurality of objects is identified based on whether the first subset of the plurality of objects are common among one or more previously retrieved web pages.

7. The apparatus of claim 1, wherein at least one of the subset of the plurality of references is modified based on a MIME Hypertext Markup Language (MTHML) format or a data Uniform Resource Identifier (URI) format or the first bundle is generated based on a Java Archive (JAR) format.

8. A method for accelerating web page loading implemented by a network traffic management system comprising one or more web proxy apparatuses, client device, or server devices, the method comprising:
    parsing source code of a web page retrieved in response to a first request from a client for the web page, wherein the source code comprises a plurality of references each to at least one of a plurality of objects and the first request is received via one or more communication networks;
    identifying, from two or more of the plurality of references and based on one or more characteristics of each of the plurality of objects, a first subset of two or more of the plurality of objects to include in a first bundle;
    obtaining the first subset of the plurality of objects from one or more servers and via another one or more of the communication networks, assembling each of the first subset of the plurality of objects into the first bundle comprising a single object having a filename, and storing the first bundle in the memory;
    modifying a subset of the plurality of references of the source code of the web page that correspond to the first subset of the plurality of objects to insert the filename of the single object of the first bundle into a Uniform Resource Locator (URL) of each of the subset of the references;

sending the web page with the modified subset of the plurality of references of the source code to the client via the one or more communication networks and in response to the first request;

receiving a second request from the client via the one or more communication networks for the first bundle comprising the first subset of the plurality of objects, wherein the second request includes the filename and the first subset of the plurality of objects comprises two or more of the plurality of objects; and sending the first bundle including the subset of the plurality of objects to the client via the one or more communication networks and in response to the second request.

9. The method of claim 8, wherein the first subset of the plurality of objects is identified based on a predicted change frequency of each of the first subset of the plurality of objects.

10. The method of claim 8, wherein the first bundle is generated to have a size not greater than a receive window of a web browser executed by the client.

11. The method of claim 8, wherein the first subset of the plurality of objects are within a visibility area of a window of a web browser and the method further comprises modifying the source code of the web page to include loading instructions that are configured to cause the web browser to send the second request for the first bundle prior to a third request for a second bundle comprising a second subset of the plurality of objects that are outside the visibility area of the window of the web browser.

12. The method of claim 8, wherein the first bundle is optimized for a cache of the client using at least one of an e-tag or cookie derived information.

13. The method of claim 8, wherein the first subset of the plurality of objects is identified based on whether the first subset of the plurality of objects are common among one or more previously retrieved web pages.

14. The method of claim 8, wherein at least one of the subset of the plurality of references is modified based on a MIME Hypertext Markup Language (MTHML) format or a data Uniform Resource Identifier (URI) format or the first bundle is generated based on a Java Archive (JAR) format.

15. A non-transitory computer readable medium having stored thereon instructions for accelerating web page loading comprising machine executable code which when executed by one or more processors, causes the processors to:

parse source code of a web page retrieved in response to a first request from a client for the web page, wherein the source code comprises a plurality of references each to at least one of a plurality of objects and the first request is received via one or more communication networks;

identify, from two or more of the plurality of references and based on one or more characteristics of each of the plurality of objects, a first subset of two or more of the plurality of objects to include in a first bundle;

obtain the first subset of the plurality of objects from one or more servers and via another one or more of the communication networks, assemble each of the first subset of the plurality of objects into the first bundle comprising a single object having a filename, and store the first bundle in the memory;

modify a subset of the plurality of references of the source code of the web page that correspond to the first subset of the plurality of objects to insert the filename of the single object of the first bundle into a Uniform Resource Locator (URL) of each of the subset of the references;

send the web page with the modified subset of the plurality of references of the source code to the client via the one or more communication networks and in response to the first request;

receive a second request from the client via the one or more communication networks for the first bundle comprising the first subset of the plurality of objects, wherein the second request includes the filename and the first subset of the plurality of objects comprises two or more of the plurality of objects; and send the first bundle including the subset of the plurality of objects to the client via the one or more communication networks and in response to the second request.

16. The medium of claim 15, wherein the first subset of the plurality of objects is identified based on a predicted change frequency of each of the first subset of the plurality of objects.

17. The medium of claim 15, wherein the first bundle is generated to have a size not greater than a receive window of a web browser executed by the client.

18. The medium of claim 15, wherein the first subset of the plurality of objects are within a visibility area of a window of a web browser and the machine executable code when executed by the processors further causes the processors to modify the source code of the web page to include loading instructions that are configured to cause the web browser to send the second request for the first bundle prior to a third request for a second bundle comprising a second subset of the plurality of objects that are outside the visibility area of the window of the web browser.

19. The medium of claim 15, wherein the first bundle is optimized for a cache of the client using at least one of an e-tag or cookie derived information.

20. The medium of claim 15, wherein the first subset of the plurality of objects is identified based on whether the first subset of the plurality of objects are common among one or more previously retrieved web pages.

21. The medium of claim 15, wherein at least one of the subset of the plurality of references is modified based on a MIME Hypertext Markup Language (MTHML) format or a data Uniform Resource Identifier (URI) format or the first bundle is generated based on a Java Archive (JAR) format.

22. A network traffic management system comprising one or more web proxy apparatuses, client devices, or web server devices, the network traffic management system comprising memory comprising programmed instructions stored thereon and one or more processors configured to execute the stored programmed instructions to:

parse source code of a web page retrieved in response to a first request from a client for the web page, wherein the source code comprises a plurality of references each to at least one of a plurality of objects and the first request is received via one or more communication networks;

identify, from two or more of the plurality of references and based on one or more characteristics of each of the plurality of objects, a first subset of two or more of the plurality of objects to include in a first bundle;

obtain the first subset of the plurality of objects from one or more servers and via another one or more of the communication networks, assemble each of the first subset of the plurality of objects into the first bundle comprising a single object having a filename, and store the first bundle in the memory;

modify a subset of the plurality of references of the source code of the web page that correspond to the first subset of the plurality of objects to insert the filename of the single object of the first bundle into a Uniform Resource Locator (URL) of each of the subset of the references;

send the web page with the modified subset of the plurality of references of the source code to the client via the one or more communication networks and in response to the first request;

receive a second request from the client via the one or more communication networks for the first bundle comprising the first subset of the plurality of objects, wherein the second request includes the filename and the first subset of the plurality of objects comprises two or more of the plurality of objects; and send the first bundle including the subset of the plurality of objects to the client via the one or more communication networks and in response to the second request.

23. The system of claim 22, wherein the first subset of the plurality of objects is identified based on a predicted change frequency of each of the first subset of the plurality of objects.

24. The system of claim 22, wherein the first subset of the plurality of objects are within a visibility area of a window of a web browser and the processor is further configured to execute the stored programmed instructions to modify the source code of the web page to include loading instructions that are configured to cause the web browser to send the second request for the first bundle prior to a third request for a second bundle comprising a second subset of the plurality of objects that are outside the visibility area of the window of the web browser.

25. The system of claim 22, wherein the first bundle is optimized for a cache of the client using at least one of an e-tag or cookie derived information.

26. The system of claim 22, wherein the first subset of the plurality of objects is identified based on whether the first subset of the plurality of objects are common among one or more previously retrieved web pages.

27. The system of claim 22, wherein at least one of the subset of the plurality of references is modified based on a MIME Hypertext Markup Language (MTHML) format or a data Uniform Resource Identifier (URI) format or the first bundle is generated based on a Java Archive (JAR) format.

* * * * *